US006147643A

United States Patent [19]

Aubry et al.

[11] Patent Number: 6,147,643

[45] Date of Patent: Nov. 14, 2000

[54] METHOD TO DETERMINE THE ERROR OF ORIENTATIONAL ADJUSTMENT OF THE RADIATING FACE OF AN ELECTRONIC SCANNING ARRAY ANTENNA

[75] Inventors: Claude Aubry, Grigny; Valérie Lamy, Palaiseau, both of France

[73] Assignee: Thomson-CSF, Paris, France

[21] Appl. No.: 09/255,872

[22] Filed: Feb. 23, 1999

[30] Foreign Application Priority Data

Feb. 24, 1998 [FR] France .................................. 98 02204

[51] Int. Cl.[7] .............................. H01Q 3/00; G01S 13/00

[52] U.S. Cl. ............................................ 342/359; 342/174

[58] Field of Search .................................... 342/359, 360, 342/174, 368, 371, 372; 343/703

[56] References Cited

U.S. PATENT DOCUMENTS

| | | | |
|---|---|---|---|
| 3,797,020 | 3/1974 | Roger et al. | 343/756 |
| 4,260,993 | 4/1981 | Aubry et al. | 343/779 |
| 4,665,405 | 5/1987 | Drabowitch et al. | 343/756 |
| 4,672,378 | 6/1987 | Drabowitch et al. | 342/17 |
| 4,740,791 | 4/1988 | Drabowitch et al. | 342/368 |
| 4,792,811 | 12/1988 | Aubry et al. | 343/756 |
| 5,038,149 | 8/1991 | Aubry et al. | 342/372 |
| 5,138,324 | 8/1992 | Aubry et al. | 342/140 |
| 5,455,592 | 10/1995 | Huddle | 342/359 |
| 5,650,786 | 7/1997 | Aubry et al. | 342/371 |
| 5,767,805 | 6/1998 | Aubry | 342/372 |

OTHER PUBLICATIONS

Sahmel et al, "Spatial Statistics of Instrument–Limited Angular Measurement Errors in Phased Array Radars" IEEE Trans. on Antennas and Propagation, vol. AP–21, No. 4, Jul. 1973.

*Primary Examiner*—Gregory C. Issing
*Attorney, Agent, or Firm*—Oblon, Spivak, McClelland, Maier & Neustadt, P.C.

[57] ABSTRACT

In order to carry out the on-site determining of the error of orientational adjustment of an electronic scanning antenna, this error being due to defects of manufacture of the radiating face of this antenna, radioelectric measurements are used during the qualification of this antenna. These measurements are made for several directions of the antenna beam, and the most likely components of the aiming error are selected.

6 Claims, 1 Drawing Sheet

METHOD TO DETERMINE THE ERROR OF ORIENTATIONAL ADJUSTMENT OF THE RADIATING FACE OF AN ELECTRONIC SCANNING ARRAY ANTENNA

BACKGROUND OF THE INVENTION

1. Field of the Invention

The present invention relates to a method to determine the error of orientational adjustment of the radiating face of an electronic scanning array antenna.

A brief description shall be given first of all of the working of an antenna of this kind. It constituted by a multitude of radiating elements, of the dipole type for example, generally positioned at the nodes of a regularly arranged (rectangular, triangular or more generally bi-periodic) plane mesh structure. An electronically controlled phase-shifter device is associated with each of these radiating elements. The value of the phase shift applied to a given element is a function of the desired direction of aim of the beam and of the position of this element in the array, in such a way that the values contributed to the radiation of the antenna by the various radiating elements get added together in phase in the chosen direction. The said position of the element is specified in a reference system (ox, oy) related to the radiating face of the antenna. The point of origin o is chosen generally at the center of symmetry of the array. The directions of ox and oy are those of the axes of symmetry of the mesh structure of the array. This reference system take the physical form, for example, of lines etched on the structure of the antenna. But it may also be purely virtual without being concretely represented in any way.

The state of each of the phase-shifters, namely the phase shift that each phase-shifter gives to the signal that goes through it, is controlled by a specialized computer called a "beam steering unit". The beam steering unit for its part receives its commands from the central computer of the radar in the form, inter alia, of two direction cosines, u and v, defining the desired direction of aim in the reference system (ox, oy), whether physically represented or not, related to the radiating face of the antenna. It may be recalled that u and v represent the components, in the reference system considered, of the projection, on the plane of the radiating face of the antenna, of the unit vector pointed in the requested direction of aim.

Independently of the existence or non-existence of the reference system (ox, oy), there always exists a physically represented reference system (IX, IY, IZ) attached to the structure of the antenna, generally located outside the radiating part, in which there are performed the optical aiming operations that are indispensable to the following operations:

- firstly, aligning the entire aerial (radiating surface, rotation mechanism, support platform or turret, etc.) with respect to the absolute ground reference in which the radar is operating,
- secondly, measuring the precision of aim of the antenna during the qualification of this antenna as an instrument of angular measurement of radar targets. The inevitable defects of construction mean that this physically represented reference is not exactly parallel, as would be desirable, to the reference system (ox, oy) (made complete by the axis oz perpendicular to ox and oy).

2. Description of the Prior Art

The problem that arises then is that of precisely determining the orientation of the radiating face of the antenna with respect to the reference system (IX, IY, IZ). This orientation is defined for example by the values of the three elementary rotations:

- a rotation, which may be called a "defect of tilt" about the axis IX deemed to be horizontal, with a value $\delta x$;
- a rotation about the axis IY, deemed to be vertical, with a value $\delta\beta$;
- a rotation called a "rolling defect" about the axis oz, with a value $\epsilon\gamma$;

Hitherto, the problem was resolved in the factory, before the installation of the aerial on the test site with a view to its qualification. This qualification comprised measurements of radiation patterns, gain, aiming precision, etc. This factory operation enabled the implementation, in weatherproof conditions, of the methods of standard metrology using systems of optical sighting and targeting by means of laser devices.

The main drawback of the usual method is that it calls for the antenna to be immobilized in the factory for a period of time that may cause problems with respect to increasingly heavy constraints in terms of time limits and therefore costs.

SUMMARY OF THE INVENTION

An object of the present invention is a method for determining the error of orientational adjustment of the radiating face of an electronic scanning array antenna that does not call for the immobilizing of the antenna in the factory and can be implemented on a site where the antenna is used, this method being implemented in a simple way without requiring measurements other than those normally required for the qualification of the antenna on site, a determining operation of this kind being furthermore capable of being performed again after the antenna has been put into service, for example in the event of a drift in its characteristics owing to its ageing or in the event of an accident.

According to the invention, there is proposed a method for the on- site determining of the error of orientational adjustment of an electronic scanning antenna, this error being due to defects of manufacture of the radiating face of the antenna, with a view to the correction of this error, wherein the determining is done by means of radioelectrical measurements of the components of the error of orientational adjustment of the antenna in several directions of the space scanned by the antenna beam.

These measurements advantageously form part of the series of measurements made during the qualification of the antenna (determining of the aiming precision of the antenna). Preferably, the results of at least ten measurements are used. These measurements are each performed in a different direction of aim, and the components of the error of orientational adjustment of the antenna are deduced statistically.

BRIEF DESCRIPTION OF THE DRAWINGS

The present invention will be understood more clearly from the reading of a detailed description of a mode of implementation taken as a non-restrictive example illustrated by the appended drawing, wherein.

MORE DETAILED DESCRIPTION

The invention is described in detail here below with reference to a plane microwave electronic scanning antenna. However it is clear that the invention cannot be limited to this application alone and that it may be implemented for sonar antennas and for different types of antennas: non-periodic arrays, non-plane arrays and surface or volume arrays.

The method of the invention advantageously makes use of the results of the operations of qualification of an antenna on the site in which it is installed, but it is clear that it can also be implemented by means of specific measurements made independently of the operations of qualification.

These operations of qualification, which are known per se, essentially consist of the determining of the phasing precision of the antenna for N directions of the space that can be scanned by the antenna. This determining is done by means of fine optical measurements generally carried out with a theodolite. Typically, N may be equal to 20. This phasing precision can generally be expressed in the form of components of the values of angular divergence between the requested aiming direction of the beam and the direction that is obtained.

Figure 1:
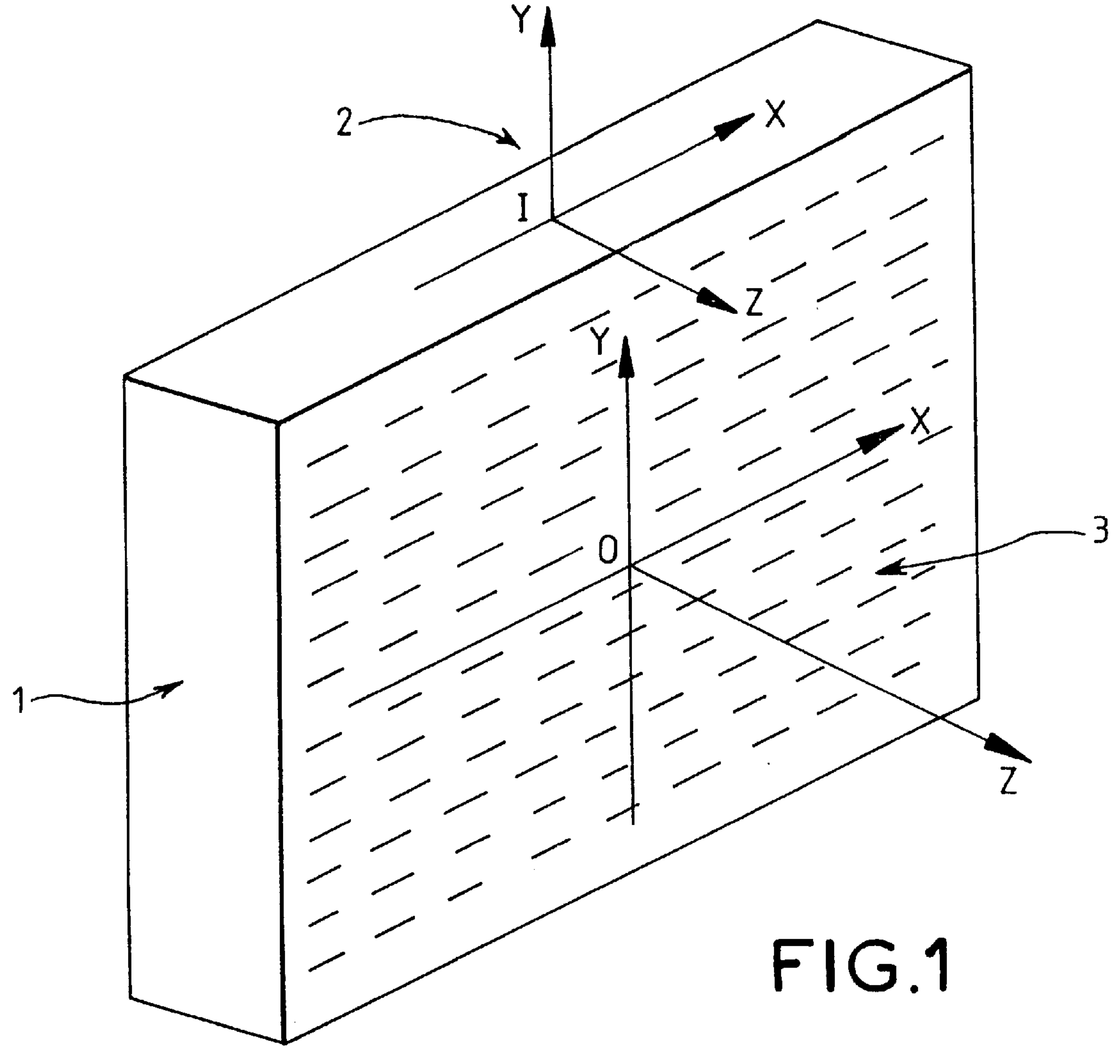
FIG. 1 is a schematic representation of an electronic scanning antenna, in which there are shown reference trihedrons used to determine the aiming error in accordance with the method of the invention.

FIG. 1 shows an electronic scanning antenna 1. This antenna 1 comprises a physically represented reference system 2 fixed to the structure of the antenna and used for said optical measurements. On the reference system 2, there is a reference trihedron (I, X, Y, Z) whose axes IX and IY are parallel to the plane of the antenna and whose axis IZ is perpendicular to this plane.

In the case of a non-plane antenna, a plane (I, X, Y) is defined for which the axis IZ (perpendicular to this plane) coincides with the central direction of the solid angle of this space scanned by the beam of the antenna.

Furthermore, FIG. 1 shows a reference system 3, which may be real or virtual. This reference system 3 is a trihedron (o, x, y, z), that is homologous to the trihedron of the reference system 2 and its orientation depends on the manufacturing quality of the antenna. If this antenna is perfect, the axes of the two trihedrons would be respectively parallel to each other. Hereinafter, we shall not take account of errors due to other imperfections (the mechanical fixing of the antenna to its support, which may be fixed or mobile, etc.) which are corrected in a manner known per se.

Figure 2:
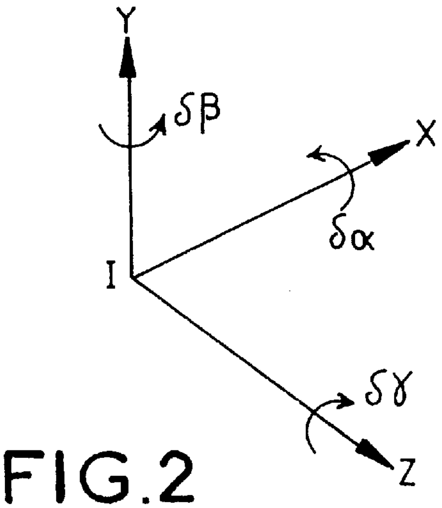
FIG. 2 is a separate view of the trihedron, showing the components of the rotations defining the aiming error of the antenna of FIG. 1.

The problem resolved by the invention is that of aligning the references systems 2 and 3, namely defining the rotations δα, δβ and δγ about the axes IX, IY and IZ respectively (FIG. 2) necessary to make the axes ox, oy and oz parallel to the axes IX, IY and IZ respectively, so that the aiming direction, controlled from the control station of the radar to which the antenna 1 belongs, coincides with the real direction of aim of the beam of the antenna 1. With these rotations being known, the computer of the control station takes account of these corrections when it prepares the aiming commands for the beam of the antenna.

We shall first of all give a brief description of the method of assessment of the precision of phasing of an antenna as is generally done when it is being qualified.

A set of N directions of space is considered. These N directions are defined by their direction cosines ($u_i$ $v_i$) in the reference system (ox, oy). For each of these directions, the associated aiming error ($\delta u_i$ $\delta v_i$) is determined as follows: the requested aiming direction, is compared with the direction actually aimed at, measured by means of a theodolite with respect to on the reference trihedron (IX, IY, IZ). The sequence of operations depends on the way in which the phasing precision of the antenna has been specified: individual standard deviation values on u and v, mean square deviation of the angular error throughout the scanned domain or on a part of it.

The proposed method of restitution essentially entails the assumption that, apart from orientation defects, the making of the antenna is perfect from the mechanical viewpoint. In other words, the "mechanical" errors have been compensated for in a manner known per se and the aiming error of the beam is assumed to arise solely from the following causes:

firstly the routine defect of orientation of the radiating face with respect to the physically represented reference system (IX, IY, IZ), secondly the defects known as "radioelectric" defects affecting the aiming phase-shifters with which the antenna is equipped.

With regard to the aiming error induced by the orientation defect, the values δα, δβ, δγ of the elementary rotations are small enough to justify the linearizing of this error as follows:

$$\delta u_i = v_i.\delta\gamma + w_i.\delta\beta$$

$$\delta v_i = u_i.\delta\gamma - w_i.\delta\alpha$$

with: $1 \leqq i \leqq N$ where $w_i$ designates the third direction cosine of the direction of aim number i $$w_i = \sqrt{1 - (u_i)^2 - (v_i)^2}$$

With respect to the "radioelectric" component referenced ($\Delta u_i$, $\Delta v_i$), theoretical considerations lead to its being considered as being random, Gaussian, centered and independent from one aiming operation to another, $\Delta u_i$ and $\Delta v_i$ being themselves independent of each other and having respective standard deviation values σu and σv independent of the aiming. The model adopted for the aiming error is therefore expressed as:

$$\delta u_i = v_i.\delta\gamma + w_i.\delta\beta + \Delta u_i$$

$$\delta v_i = u_i.\delta\gamma + w_i.\delta\alpha + \Delta v_i$$

with: $1 \leqq i \leqq N$

This form of error is particularly well suited to the use of the method known in the theory of statistical estimation as the "maximum likelihood method". Briefly, this method consists of the maximizing, with respect to the unknown parameters, in this case the three elementary angles of rotation, of the (conditional) probability of measuring the errors ($\delta u_i$, $\delta v_i$) assuming that these parameters are known. In the present case of a Gaussian additive noise, the most likely values are those that minimize the mean square deviation:

$$\varepsilon(\delta\alpha, \delta\beta, \delta\gamma) = \sum_i [\delta u_i - (-v_1 \cdot \delta\gamma + w_i \delta\beta)]^2 + \mu \cdot [\delta v_i - (u_i \delta\gamma - w_i \cdot \delta\alpha)]^2$$

where $\mu$ represents the ratio of the variances of the radioelectric components, giving $\sigma u^2/\sigma v^2$. This ratio may be assessed either theoretically, from the structure of the antenna and the statistical properties of the phase defects, or experimentally by the measurement of the aiming precision known as the "differential" precision defined as the fluctuation of the aiming error, on u and on v, as a function of the frequency, for a given direction of aim.

The optimal values of the angles defining the orientation of the radiating face of the antenna are given by the matrix relationship:

$$\begin{pmatrix} \delta\alpha \\ \delta\beta \\ \delta\gamma \end{pmatrix} = M^{-1} \sum_i \delta u_i \cdot U_i + \mu \cdot \delta v_i \cdot V_i$$

where the column matrices Ui and Vi define the directions of measurement of the beam-aiming errors:

$$U_i = \begin{pmatrix} o \\ w_i \\ -v_i \end{pmatrix} \qquad V_i = \begin{pmatrix} -w_i \\ o \\ u_i \end{pmatrix}$$

and M is the third-order square matrix (the exponent T symbolizes the operation of transposition):

$$M = \sum_i (U_i \cdot U_i^T + \mu \cdot V_i \cdot V_i^T)$$

Naturally, other known statistical methods would make it possible to obtain values of δα, δβ and δγ through the results of qualification measurements.

By way of an example, the method of the invention was implemented for a plane array antenna with bidirectional electronic scanning. The three elementary rotations were determined according to the maximum likelihood criterion. First of all, the measurement results were processed for N=20 and the following were obtained:

δα=4.79 m rad δβ=−2.03 m rad δγ=−1.83 m rad

The results of the measurements were then processed in taking only half of them and the following values were obtained respectively (hence for N=10):

δα=4.81 m rad δβ=−2.06 m rad δγ=−1.72 m rad

It is observed that the difference between these two series of results is smaller than one-tenth milliradian, a value that is negligible as compared with the overall aiming precision of the radar, and that it is possible to take N≧10.

What is claimed is:

1. A method of determining an aiming error for a scanning antenna, comprising:

requesting said scanning antenna to be aimed in N aiming directions;

measuring N actual directions with respect to a first reference system, said scanning antenna being actually aimed at said N actual directions and said first reference system being independent of said scanning antenna;

calculating an orientation defect component of said aiming error by summing products between direction cosines of said N aiming directions and elementary rotations about axes of said first reference system, said direction cosines defining said N aiming directions with respect to a second reference system associated with said scanning antenna;

defining a radioelectronic defect component of said aiming error as a random value independent from said N aiming directions;

adding said orientation defect component to said radioelectronic defect component; and statistically solving for said elementary rotations.

2. The method of claim 1, wherein calculating said orientation defect component is performed by calculating:

$v_i\delta\gamma + w_i\delta\beta$, and $u_i\delta\gamma - w_i\delta\alpha$, where 1≦i≦N, $u_i$, $v_i$, $w_i$ represent said direction cosines of said N aiming directions, u being a first direction cosine, v being a second direction cosine and $w=(1-(u_i)^2-(v_i)^2)^{1/2}$, and δα, δβ, δγ are said elementary rotations.

3. The method of claim 2, wherein adding said orientation defect component to said radioelectronic defect component comprises calculating:

$\delta u_i = v_i\delta\gamma + w_i\delta\beta + \Delta u_i$, $\delta v_i = u_i\delta\gamma + w_i\delta\alpha + \Delta v_i$, where $\Delta u_i$ represents the radioelectronic defect component of said aiming error for said first direction cosine, $\Delta v_i$ represents the radioelectronic defect component of said aiming error for said second direction cosine, $\delta u_i$ represents the aiming error for said first direction cosine, and $\delta v_i$ represents the aiming error for said second direction cosine.

4. The method of claim 3, wherein statistically solving for said elementary rotations comprises estimating δα, δβ, δγ with the "maximum likelihood" statistical method.

5. The method of claim 1, wherein aiming said scanning antenna in N aiming directions comprises aiming said antenna in at least ten aiming directions.

6. The method of claim 1, wherein measuring N actual directions with respect to a reference system comprises measuring N actual directions with a theodolite.

* * * * *